US010143943B2

(12) United States Patent
McAlister et al.

(10) Patent No.: US 10,143,943 B2
(45) Date of Patent: Dec. 4, 2018

(54) METHOD AND APPARATUS FOR LIQUID/SOLID SEPARATION SUCH AS DEWATERING PARTICULATE SOLIDS AND AGITATION LEACHING

(71) Applicant: Sepro Mineral Systems Corp., Langley (CA)

(72) Inventors: Steven Alexander McAlister, Abbotsford (CA); Mark Donald Van Kleek, Surrey (CA); Michael Charles Jillings, Chilliwack (CA); Brennan James Mallory, Surrey (CA); Mark Henry Vinchoff, Chilliwack (CA)

(73) Assignee: Sepro Mineral Systems Corp., Langley, BC (CA)

( * ) Notice: Subject to any disclaimer, the term of this patent is extended or adjusted under 35 U.S.C. 154(b) by 197 days.

(21) Appl. No.: 14/767,877

(22) PCT Filed: Sep. 26, 2014

(86) PCT No.: PCT/CA2014/050925
§ 371 (c)(1),
(2) Date: Aug. 13, 2015

(87) PCT Pub. No.: WO2015/042715
PCT Pub. Date: Apr. 2, 2015

(65) Prior Publication Data
US 2015/0367255 A1     Dec. 24, 2015

Related U.S. Application Data (60) Provisional application No. 61/883,411, filed on Sep. 27, 2013.

(51) Int. Cl.
*B01D 21/28*     (2006.01)
*B01D 24/14*     (2006.01)
(Continued)

(52) U.S. Cl.
CPC ......... *B01D 21/28* (2013.01); *B01D 21/0018* (2013.01); *B01D 21/2444* (2013.01);
(Continued)

(58) Field of Classification Search
CPC .... B01D 36/04; B01D 21/0018; B01D 21/24; B01D 24/14; B01D 21/28
See application file for complete search history.

(56) References Cited

U.S. PATENT DOCUMENTS

| 497,856 A | 5/1893 | Brown |
| 727,230 A | 5/1903 | Underwood |

(Continued)

FOREIGN PATENT DOCUMENTS

| CA | 1269252 A | 11/1985 |
| CN | 101574599 A | 11/2009 |

(Continued)

OTHER PUBLICATIONS

Xiong Sida. CN 101574599 A published Nov. 11, 2009. Machine translation.*

(Continued)

*Primary Examiner* — George Wyszomierski
*Assistant Examiner* — Tima M McGuthry-Banks
(74) *Attorney, Agent, or Firm* — Kilpatrick Townsend & Stockton (57) ABSTRACT

Methods and apparatus for liquid/solid separation for use in applications such as dewatering fine particulate solids, and recovery of valuable metals from ore in a leaching process are provided. One application relates to methods of agitation leaching of metals such as gold from gold-bearing feedstock. A slurry is formed in a tank by agitation, and allowed to settle. A filter bed forms to drain the liquid from the tank, (Continued)

and a vertical screen pipe such as a well point addresses the formation of an impervious film on the upper surface of the filter bed.

6 Claims, 6 Drawing Sheets

(51) Int. Cl.
    *B01D 36/04*     (2006.01)
    *B01D 21/00*     (2006.01)
    *B01D 21/24*     (2006.01)
    *C22B 3/26*     (2006.01)
    *C22B 3/04*     (2006.01)
    *C22B 3/00*     (2006.01)
    *C22B 15/00*     (2006.01)
    *C22B 60/02*     (2006.01)

(52) U.S. Cl.
    CPC ............. *B01D 24/14* (2013.01); *B01D 36/04* (2013.01); *C22B 3/0005* (2013.01); *C22B 3/04* (2013.01); *C22B 11/04* (2013.01); *C22B 15/0065* (2013.01); *C22B 60/0221* (2013.01); *Y02P 10/234* (2015.11); *Y02P 10/236* (2015.11)

(56) References Cited

U.S. PATENT DOCUMENTS

| | | | |
|---|---|---|---|
| 1,969,022 | A | 8/1934 | Laughlin et al. |
| 3,524,810 | A | 8/1970 | Mackrle et al. |
| 4,177,068 | A | 12/1979 | Balakrishnan et al. |
| 4,289,532 | A | 9/1981 | Matson et al. |
| 4,960,461 | A | 10/1990 | Esna-Ashari et al. |
| 4,991,824 | A | 2/1991 | Mackie |
| 5,096,678 | A | 3/1992 | Mackie |
| 5,171,443 | A * | 12/1992 | Bratten .................. B01D 24/14 210/269 |
| 5,529,606 | A | 6/1996 | Hewlett |
| 6,613,271 | B1 | 9/2003 | Lewis-Gray |
| 7,731,840 | B1 | 6/2010 | Mallonee et al. |
| 8,283,295 | B1 | 10/2012 | Shadikhan |
| 2009/0031862 | A1 | 2/2009 | Ourriban et al. |

FOREIGN PATENT DOCUMENTS

| | | |
|---|---|---|
| CN | 200910064731 A | 10/2010 |
| DE | 19524441 A1 | 1/1997 |
| EP | 0519408 A1 | 12/1992 |
| FR | 1578178 A | 8/1969 |
| FR | 2044365 A5 | 2/1971 |

OTHER PUBLICATIONS

Office Action corresponding to Chinese application 201480053528.3 dated Mar. 29, 2017, seven pages.
English translation of Supplementary Search Report corresponding to Chinese application 2014800535283 dated Mar. 17, 2017, two pages.
John O. Marsden and C. Iain House, The Chemistry of Gold Extraction, 2nd ed. (Denver: SME, 2006) (cover page and relevant sections), four pages.
Sabir Syed, "Recovery of gold from secondary sources—A review", (2012) 115-116 Hydrometallurgy 30, 22 pages.
R. J. Davidson et al, "The intensive cyanidation of gold-plant gravity concentrates", Jan. 1978 Journal of the South African Institute of Mining and Metallurgy 146-165, 20 pages.
A. H. (Sandy) Gray and Nick Katsikaros, The InLine Leach Reactor—The New Art in Intensive Cyanidation of High Grade Centrifugal Gold Concentrates (Denver: Randol Gold and Silver Forum, 1999), five pages.
W Lethlean and Laurie Smith, Leaching Gravity Concentrates Using the ACACIA Reactor (Denver: Randol Gold and Silver Forum, 2000), pp. 1-11, eleven pages.
Extended European Search Report in connection with European Application No. 14849118.6 dated Sep. 7, 2016, eight pages.
Office Action corresponding to Chinese application 201480053528.3 dated Sep. 19, 2017, 14 pages.
English translation of Supplementary Search Report corresponding to Chinese application 2014800535283 dated Aug. 25, 2017, one page.

* cited by examiner

METHOD AND APPARATUS FOR LIQUID/SOLID SEPARATION SUCH AS DEWATERING PARTICULATE SOLIDS AND AGITATION LEACHING

CROSS REFERENCE TO RELATED APPLICATION

The present application claims the benefits, under 35 U.S.C. § 119(e), of U.S. Provisional Application Ser. No. 61/883,411 filed Sep. 27, 2013 entitled "Method and Apparatus for Agitation Leaching" which is incorporated herein by this reference.

TECHNICAL FIELD

The invention relates to methods and apparatus for liquid/solid separation for use in applications such as dewatering particulate solids, and recovery of valuable metals from ore in a leaching process. In one aspect the invention relates to methods of agitation leaching of metals such as gold from gold-bearing feedstock.

BACKGROUND

Separating particulate solids from a liquid has a multiplicity of applications. They include dewatering of particulate slurries and separation of liquid from solids in the leaching process. The leaching of constituents from particulate mineral materials is practiced utilizing a wide variety of materials and equipment. Leaching procedures are particularly useful for the recovery of metals from particulate mineral ores, such as gold, silver, copper and uranium ores. The dominant process for the extraction of such metals from ores is leaching with lixiviants. Typical leaching methods have a number of drawbacks, in particular the need to either grind the ore finely for continuous agitation leaching or utilize batch leaching methods on coarser material.

Tank leaching is typically a continuous process, while vat leaching is operated in a batch fashion. Tank leaching is commonly used to extract gold and silver from ore. Tank leaching differs from vat leaching in that in tank leaching the material is ground sufficiently finely to form a slurry which can flow under gravity or when pumped, whereas in vat leaching typically a coarser material is placed in the vat for leaching. The tanks in the tank leaching method are typically equipped with agitators to keep the solids in suspension in the tanks and improve the solid to liquid to gas contact. Baffles can be provided to increase the efficiency of agitation and prevent centrifuging of slurries in circular tanks. The vats in vat leaching usually do not contain such equipment. In a tank leach the slurry is agitated, while in a vat leach the solids remain stationary in the vat, and solution is moved, so typically the retention time required for vat leaching is more than that for tank leaching to achieve the same percentage of recovery of the valuable material being leached.

Tank and vat leaching both involve placing the ore, after size reduction and classification, into the tanks or vats at ambient operating conditions containing a leaching solution and allowing the valuable material to leach from the ore into solution. In tank leaching the ground, classified solids are already mixed with water to form the slurry, and this is pumped into the tanks. Lixiviants are added to the tanks to achieve the leaching reaction. In a continuous system the slurry will then either overflow from one tank to the next, or be pumped to the next tank. Ultimately the pregnant solution is separated from the solids using some form of liquid/solid separation process, and the solution passes on to the next phase of recovery. In vat leaching the solids are loaded into the vat and, once the vat is full it is flooded with a leaching solution. The solution drains from the tank, and is either recycled back into the vat or is pumped to the next step of the recovery process.

The factors which affect extraction efficiency are: i) Retention time—the time spent in the leaching system by the solids. This is calculated as the total volumetric capacity of the leach tank(s) divided by the volumetric throughput of the solid/liquid slurry. ii) Particle size—The ore is ground to a size that exposes the desired mineral to the leaching agent. In tank leaching this must be a size that can be fully mixed and suspended by the agitator. In vat leaching this is the size that is the most economically viable, balancing recovery against the increased cost of processing the material. iii) Slurry density—The slurry density (percent solids) determines retention time. The settling rate and viscosity of the slurry are functions of the slurry density. The viscosity, in turn, controls the gas mass transfer and the leaching rate. iv) Dissolved gas—Gas, typically oxygen, may be injected into the solution to obtain the desired dissolved gas levels. vi) Reagents are added and the appropriate amount of reagents maintained throughout the leach circuit to maximize the metal recovery. v) Temperature—impacts the reaction kinetics. vi) Leach-inhibiting elements such as lixiviant-consuming minerals or carbonaceous materials.

The conventional knowledge says that the maximum particle size for agitation leaching should be much less than 1 mm in diameter to permit maximum recovery in a reasonable retention time, as well as allowing fully homogeneous mixing. In gold leaching by carbon capture, using finely ground particles allows carbon separation. Such a fine particle size requires expensive grinding.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention therefore provides a method and apparatus for liquid/solid separation. According to one aspect the invention provides a method and apparatus for dewatering particulate solids.

There is therefore provided an apparatus for separating a liquid from particulate solids, comprising: i) a tank for containing the particulate solids and liquid as a slurry; ii) an input to the interior of the tank for introduction of the particulate solids and liquid into the tank; iii) a liquid outlet passage communicating with the interior of the tank; iv) an agitator suspended within the tank for forming a suspension of the particles in said liquid; v) the tank having a lower section for formation of a filter bed to drain liquid from the tank; and vi) a screen pipe extending upwardly through the filter bed area and communicating with the output passage to receive at its upper end a flow of liquid from above the lower section which is carried downwardly to flow out through the filter bed section to the outlet passage or directly to the outlet passage. The screen pipe may be a well point or well screen.

According to a further aspect the present invention further provides a method of separating a liquid from particulate solids, comprising the steps of: i) providing an apparatus as described above for dewatering particulate solids, comprising: ii) introducing the particulate solids and liquid into the tank; iii) agitating the particulate solids and liquid to form a slurry; iv) ceasing the agitation to allow the slurry to settle, thereby forming a graded filter bed to drain liquid from the tank; v) using the screen pipe to transfer liquid from above the filter bed to within the filter bed or directly to the outlet passage; vi) draining the liquid from the particulate solids; and vii) removing the particulate solids. An amount of coarser particulate solids may be added to the particulate solids and liquid in the tank, wherein the coarser particulate solids are suitable for forming a filter bed. The agitator may be a variable speed agitator and the agitation is slowed prior to the settling step.

The apparatus may be used for agitation leaching of mineral-bearing or metal-bearing particles, a significant portion of which may be 1 mm in diameter or greater, wherein the particulate material comprises gold, silver, copper or uranium and the liquid comprises concentrations of lixiviant.

The method may be used for agitation leaching of mineral-bearing or metal-bearing particles, a significant portion of which may be 1 mm in diameter or greater, wherein the particulate material comprises gold, silver, copper or uranium and the liquid comprises concentrations of lixiviant.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Improvements in methods and apparatus for liquid/solid separation are described below which have applications in dewatering particulate solids. Particularly useful application is found in recovery of valuable metals from ore in a leaching process, and more particularly methods of agitation leaching of metals such as gold from gold-bearing feedstock. The apparatus utilizes slotted, apertured, fenestrated, perforated or mesh vertical tubes or pipes. One suitable form of such tube or pipe is referred to as a well point. These are vertical tubes or pipes, typically stainless steel or PVC, with a continuous array of openings, which may be a screen and/or gauze, which allow the flow of liquid into and along the central passage of the tube but prevent the entry of particles having greater than a selected diameter. They also share such features with well screens. All of these devices will be referred to interchangeably herein as well points, well screens or more generally screen pipes.

Continuous Agitation Leaching

The applicant has developed a new process and apparatus which in one application, to agitation cyanide leaching of gold-bearing particles, may includes the following features:
  leaching of particles up to approximately 2 mm in size or greater;
  high concentrations of cyanide, up to 10 times typical concentrations;
  a variable speed agitation;
  formation of a filter bed to drain the cyanide/gold solution from the tank; and
  use of a vertical screen pipe such as a well point to deal with the formation of an impervious film on the upper surface of the filter bed.

The conventional knowledge says that the maximum particle size for agitation leaching should be much less than 1 mm. The applicant has developed a new process that can process larger particles—2 mm or greater—and process them more quickly. The leaching process is intensive as the concentration of cyanide is on the order of 10 times the usual concentration. A variable speed motor 41 for the agitator 40 may be used, operating at the lowest speed possible which puts the coarsest particles into motion at the bottom of the tank, resulting in significantly less component wear than high speed homogeneous mixing. The agitator then slows so that heavier particles sink to the bottom of the tank and settle, eventually forming a graded filter bed with coarse particles at the bottom and finer particles at the top. The agitation blades remain above the bed in the liquid slurry. This graded bed serves as the filter to drain the cyanide/gold solution from the tank.

Figure 1:
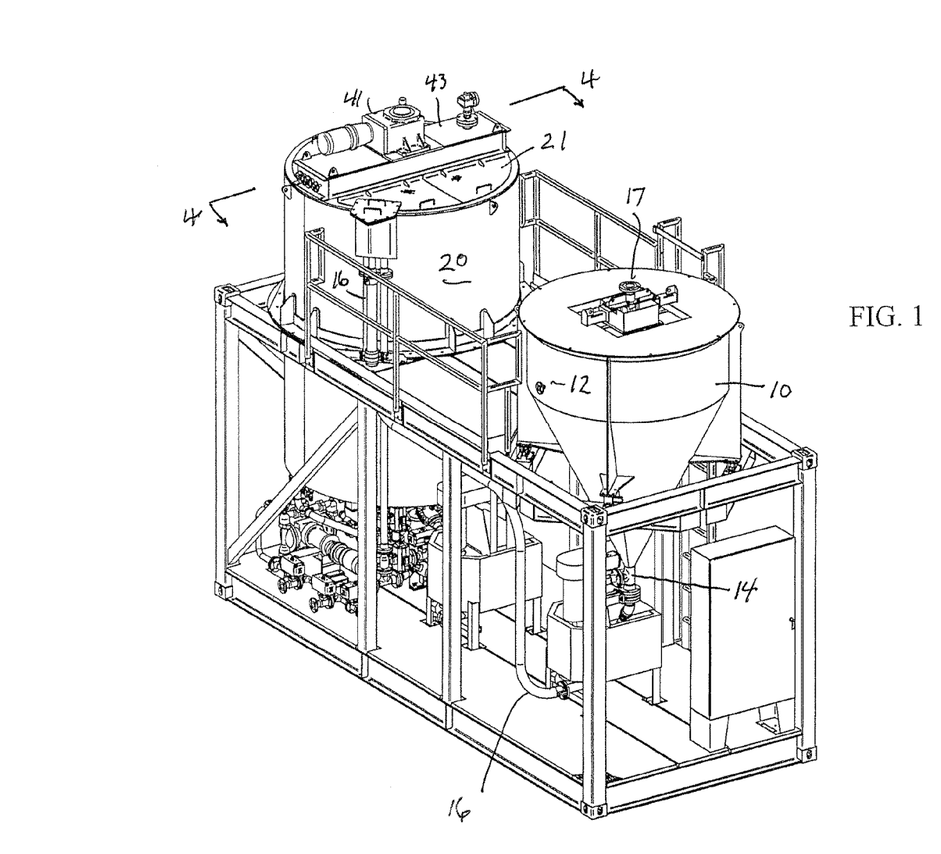
FIG. 1 is a left side perspective view of an installation for carrying out the process of the invention.
Figure 2:
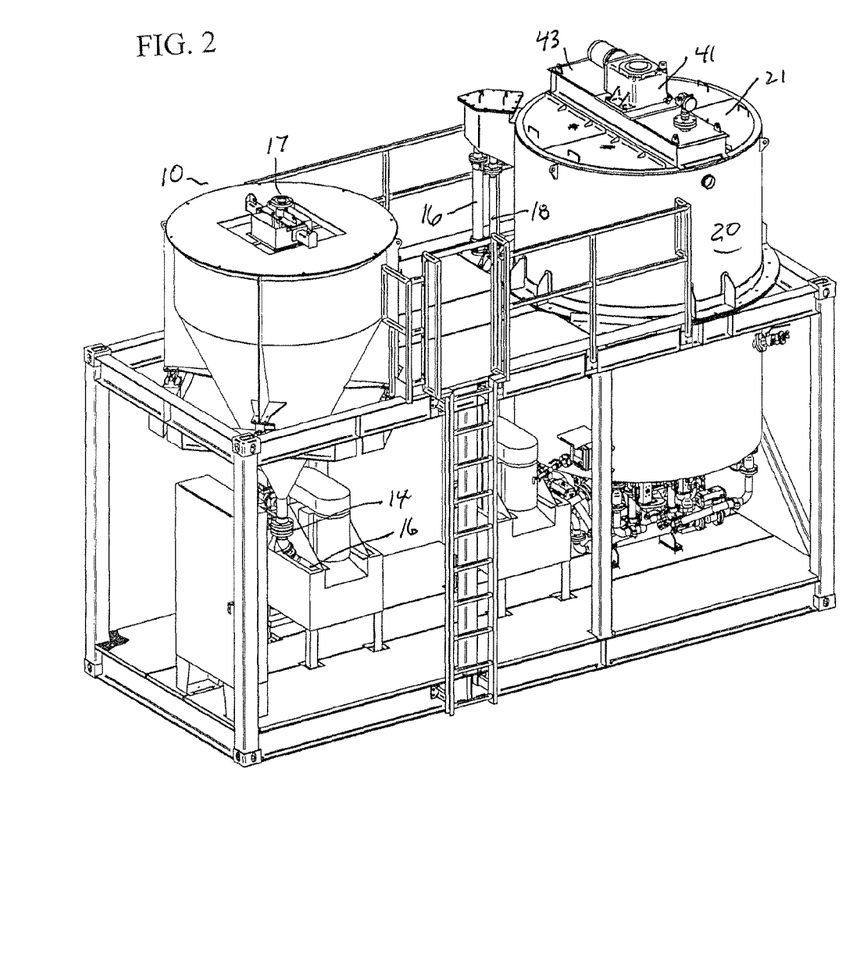
FIG. 2 is a right rear perspective view of the installation shown in FIG. 1.
Figure 3:
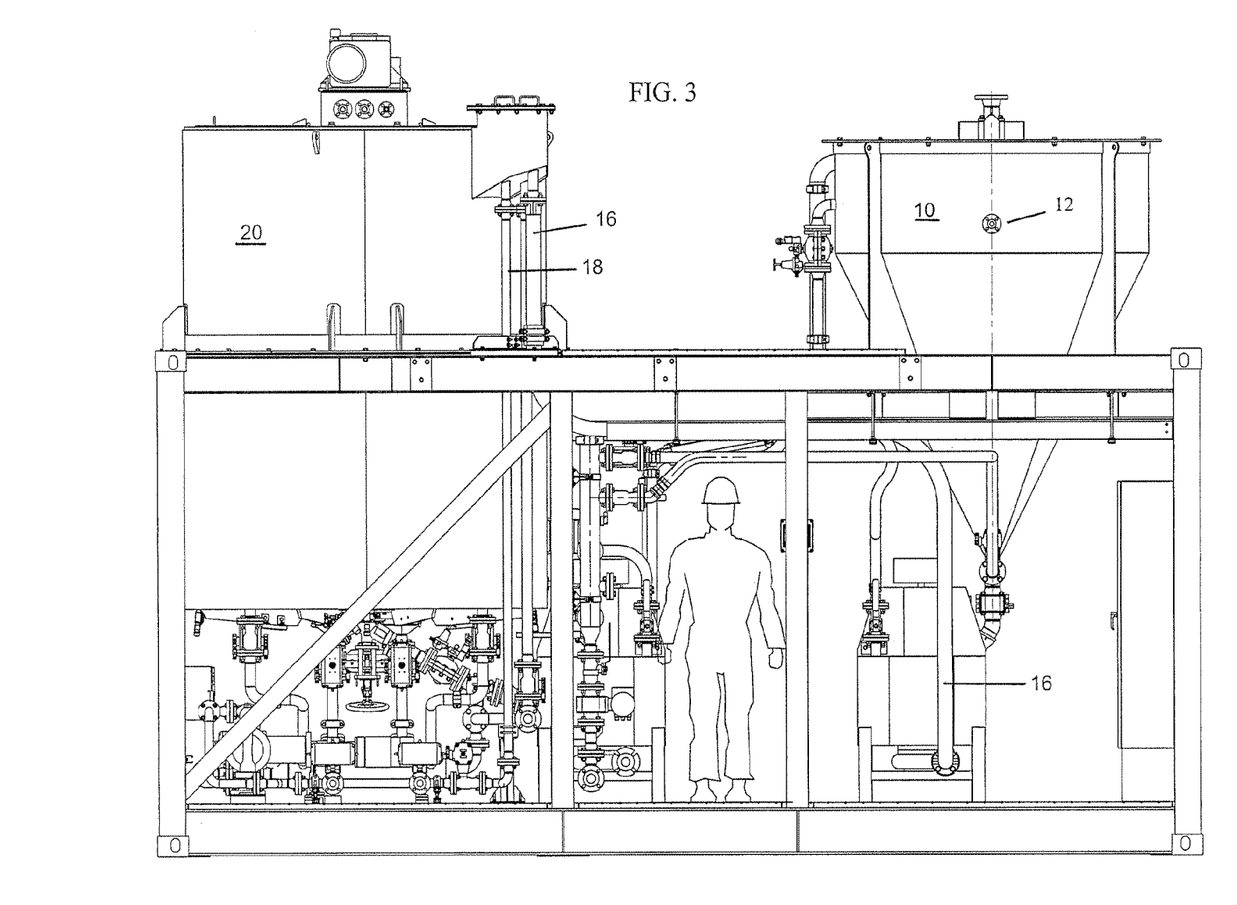
FIG. 3 is an elevation view of the installation shown in FIG. 1.
Figure 4:
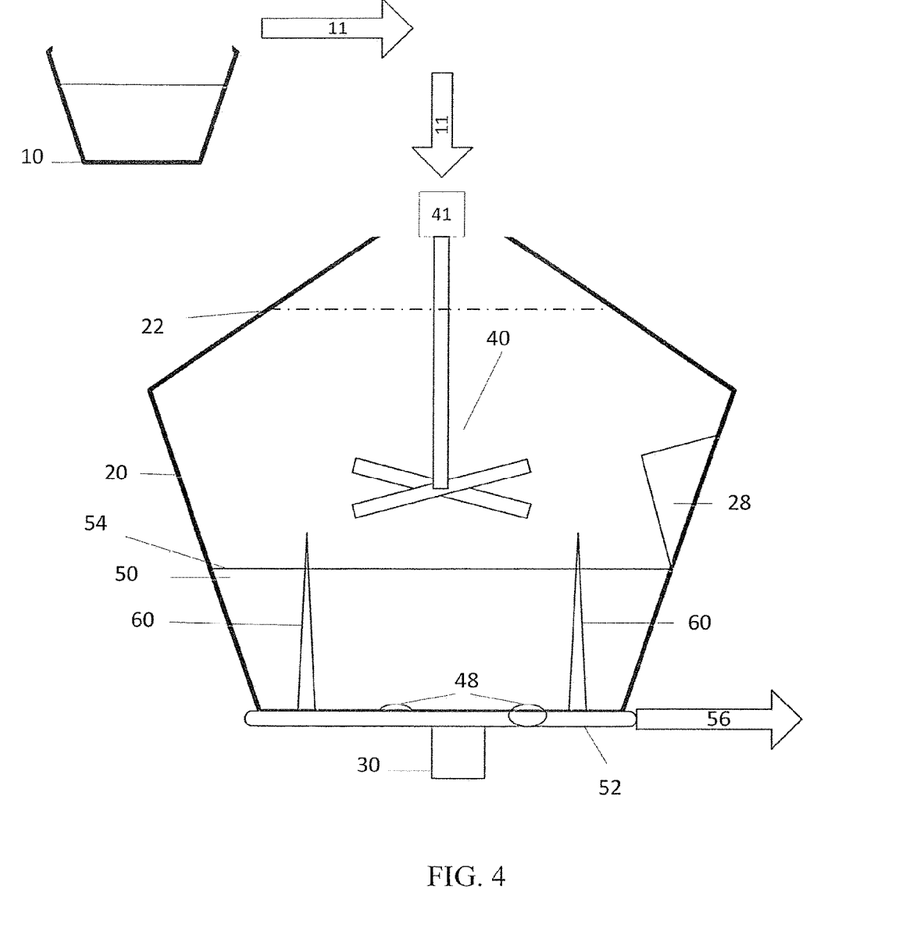
FIG. 4 is a schematic diagram taken in cross-section along lines 4-4 of FIG. 1.
Figure 6:
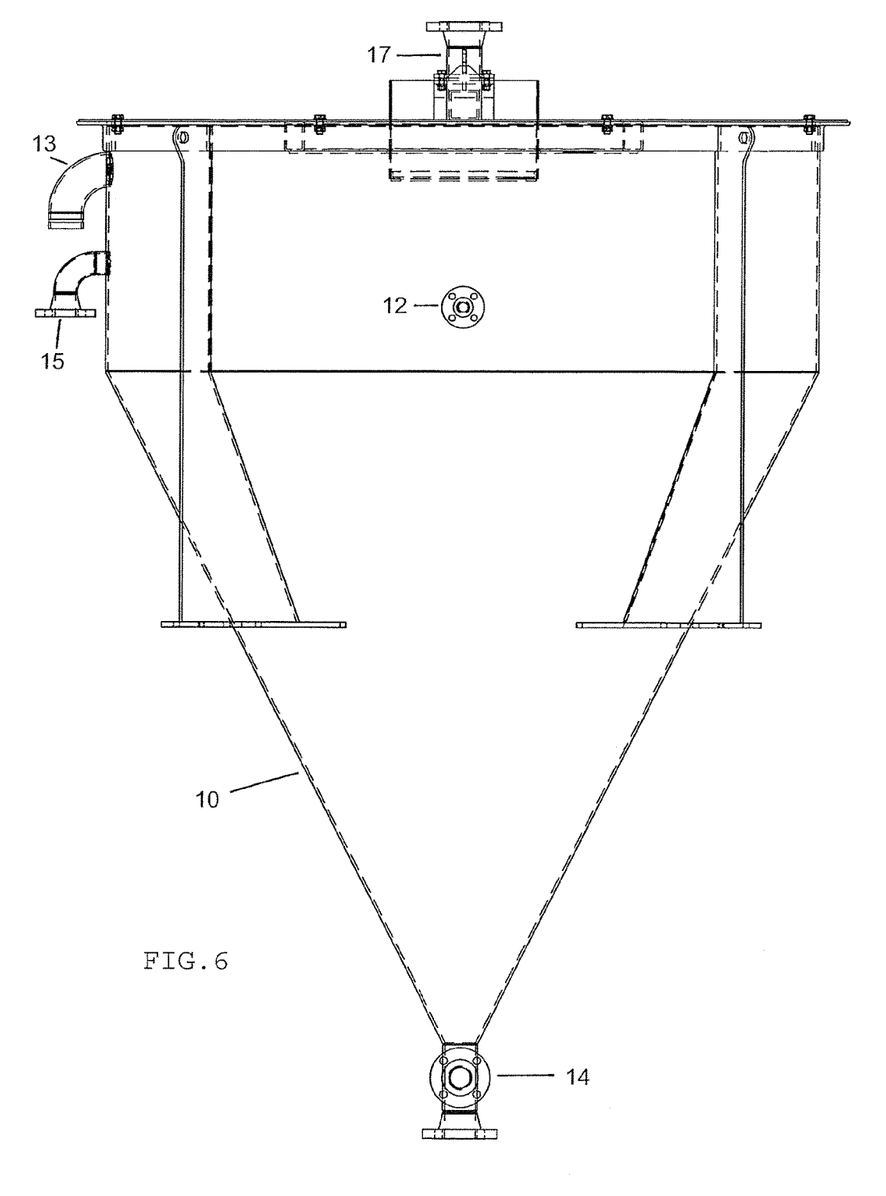
FIG. 6 is an elevation view of the settling and storage tank.

With reference to FIGS. 1, 2 and 6, a feed settling and storage tank 10 is fed gold-bearing crushed concentrate slurry, for example recovered from a centrifugal concentrator, through feed pipe 17. Solids are allowed to settle and excess water is drained off from the concentrate, such as through a bleed valve 15. Overflow pipe 13 may re-direct overflow from tank 10. A water circulation line may be provided at 12. At selected intervals, when the tank 10 is full of slurry which has been dewatered to the desired degree, the outlet valve 14 is opened and the concentrate is pumped from tank 10 via pipes 16 in the form of a slurry 11 (FIG. 4) into substantially empty leaching tank 20.

Figure 5:
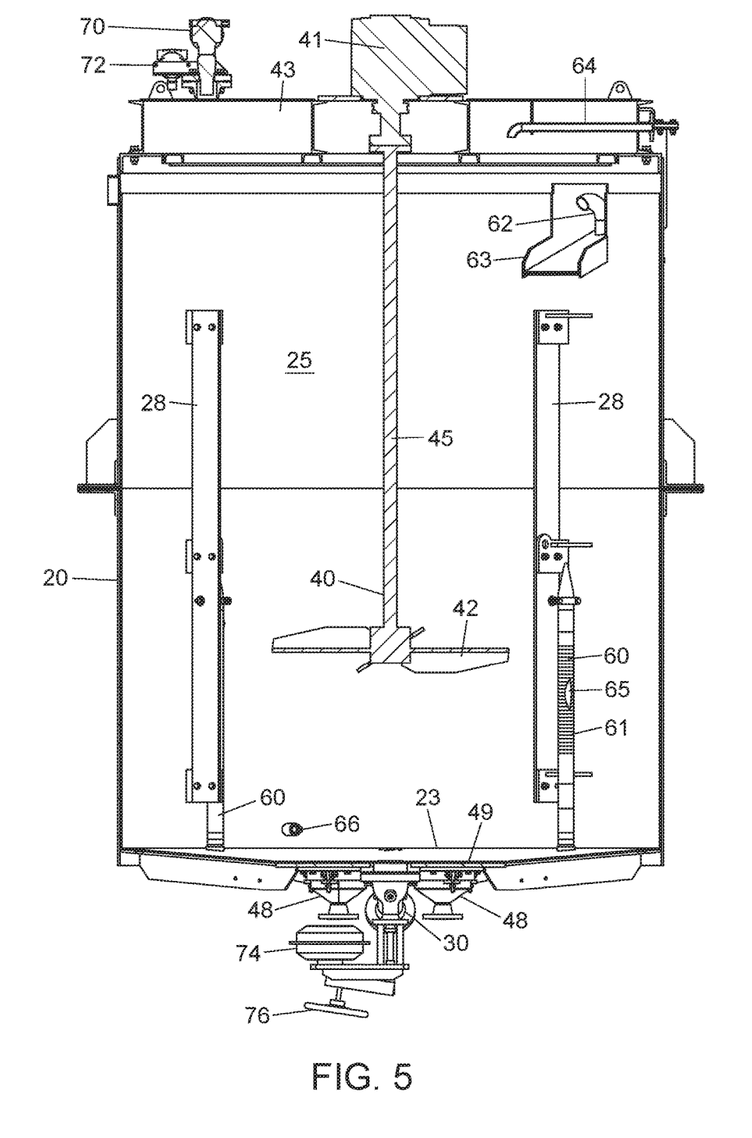
FIG. 5 is an elevation view in cross-section along lines 4-4 of FIG. 1 of the leaching tank.

Cylindrical leaching tank 20, shown in FIG. 5 has lid 21, vertical sides 25 and bottom 23. Feed pipe 62 carries the feed concentrate slurry from pipe 16 onto channel 63 and then into the interior of tank 20. Feed pipe 62 also carries the cyanide solution into tank 20. Pipe 64 is one of several adjacent pipes through which reagents can be added to the tank 20. A reagent addition pipe (not shown) and a feed pipe 18 for recirculation also enters tank 20 onto channel 63, adjacent to pipe 62. Agitator 40 driven by variable speed motor 41 is suspended from frame 43 and has blades 42 rotated on shaft 45. Level sensor 70 senses the level of solids or cyanide solution within tank 20. A hydrogen cyanide sensor 72 senses the presence of hydrogen cyanide in tank 20 as a safety measure since the gas, produced as part of the leaching process, can be explosive and highly toxic for humans when present in excessive quantities. Baffles 28 are secured to and extend from wall 25 to reduce rotation of the slurry.

Well points 60 are threaded into the bottom 23 of tank 20 and communicate by valved connection with piping 52 which removes the pregnant solution. Tailings discharge port 30 communicates with a tailings discharge pipe and is opened or closed by valve actuator 74, or alternately a manual override 76. Pots or static screens 48 are sealed to the bottom 23 of tank 20 and communicate through screens 49 with the interior of tank 20 and through pipe 52 to discharge the pregnant solution. Oxygen inlet 66 injects oxygen into tank 20.

Leaching tank 20 is filled with concentrate until the level of solids in the slurry is somewhat below the blades 42 of agitator 40. A cyanide solution, such as sodium cyanide, with a high concentration of cyanide, up to 10 times typical leaching concentrations, is added to the tank 20 via pipe 16 and discharge pipe 62, up to level 22, leaving the solid to liquid ratio at about 30-40%. Preferably finely divided oxygen bubbles are added directly to the solution via inlet 66 and dissolved leaving a minimum 10 parts per million dissolved oxygen in the solution to improve the reaction. Lid 21 allows an over-pressure to build up in tank 20 when oxygen is introduced, to increase the dissolution of oxygen in the solution.

Agitator 40 is started rotating for a number of hours, typically up to 18-20 depending on the ore characteristics. Preferably blades 42 as shown in FIG. 5 are configured to cause a shearing motion through the solution which aids the leaching. For example blades 42 may be triangular in cross-section angled downwardly with the sharp end of the triangle forming the attacking edge of the blade. Baffle 28 reduces rotation of the slurry to increase the mixing effect. Approximately 5 minutes before the agitator is stopped, coagulant may be added to the solution and mixed for a short period such as 2 minutes, followed by the addition of flocculant which is mixed for about 3 minutes. The agitator is then slowed and stopped over several minutes and the solids are allowed to settle. The heavier particles settle most quickly to form a filter bed 50, followed by the lighter particles. A typical settling time is 30 minutes.

As the finest particles settle out of the slurry, a thin film forms at 54 over the bed 50. To allow liquid to easily flow through bed 50, well points or screens 60 extend through the fines film that coats the filter bed at 54. A suitable type of well point for example has a roughly 2" inside diameter by about 3' long with $7/1,000$" to $10/1,000$" slot openings as manufactured by Johnson Screens. One size used successfully was a size 2P Sand Point Tube, 60 wire model 304 Stainless Steel screen with $10/1,000$ inch screen openings, model number 936. Well screens may also be used. Well points 60 have a plurality of openings 61 on their surfaces opening to a hollow interior 65 shown by a cutaway in FIG. 5. The liquid flows through the well point and into bed 50 when the valve connecting the well point 60 to pipe 52 (not shown) is shut, and directly out pipe 52 when open.

The well points 60 are first cleared by back flushing, by reversing vacuum pump 56, and then recirculating liquid through the well points by vacuum pump 56 with the well point valves open, central draw through screened pots 48 closed, and recirculation pipe 18 open. Once the well points are clear, after about 3 minutes of recirculation, the well point valves are closed and the pregnant solution is drawn through the well points into bed 50 and out bottom screened pots 48 by vacuum pump 56 into outlet pipe 52 and then preferably the pregnant solution is recirculated through pipe 18 back into the top of tank 20 and through the well points 60 and filter bed 50 for a further short period of time, such as 5-6 minutes, to clarify the solution, until the clarity of the effluent is clear enough for further processing. The clarified pregnant liquid can then be pumped directly by vacuum pump 56 through the well points 60 by opening the valved connection to pipe 52, or indirectly through bed 50 and pots 48 into outlet pipe 52, and pumped to a holding tank in preparation for electrowinning or other processing method.

Once the liquid from tank 20 is removed, the concentrate bed 50 is rinsed and the liquid removed to recover any dissolved gold. This can be done by first adding barren cyanide or water to the tank 20, up to the level of the agitator 40, or above that level if agitation is desired, and draining the liquid through the bed 50 to pipe 52. Cyanide is then removed from the bed 50. This may be done by carrying out a clean water rinse which is carried out pipe 52 to a different destination than the pregnant solution or using other known cyanide removal methods. The solids are then drained by adding water above the level of the agitator 40, agitating for a short period such as 5 minutes, and then allowing the slurried concentrate to flow by gravity through discharge port 30.

Example 1—Cyanide Leaching of Gold

A successful pilot plant as described above was set up to test the invention for cyanide leaching of gold from gravity concentrated ore. Feed storage tank 10 had a volume of 2.3 m$^3$. Leach tank 20 had a volume of 8 m$^3$, which volume can be varied depending on throughput. Openings in the well points 60 and bottom screens 49 were sized at 25 microns. Agitator 40 rotational speed was set at 100 to 120 rpm. Settling time with the agitator 40 stopped was 30 minutes to settle particles smaller than 75 microns.

The pilot plant provided successful leaching of the gold with a maximum leaching retention time of 18 to 20 hours, out of a 24-hour operating cycle. The maximum daily throughput was 4 tons per day of solids, with 3 tons per day being typical. Feed particle size was maximum 6 mm, with 2 mm being typical. This is typical particle size for the concentrate from a Falcon Concentrator. The concentration of gold in the feed solids was about 800 grams/tonne, to 900 grams/tonne. A concentration of cyanide in the leaching solution of 10,000 ppm to about 25,000 ppm, and typically 20,000 ppm was used. The concentration is selected depending on the ore properties. Leach tank 20 solids concentration was a maximum 40 weight percent with 30 weight percent being typical. Reagents were used, with NaCN used for setting the concentration of CN (cyanide), pH Control provided by lime or NaOH, and dissolved Oxygen ($O^{2-}$) control by sparged oxygen gas or air. Four well points and four screened pots 48 were used to drain the liquid although a smaller number would also have worked, as few as two well points and one screened pot 48.

The trial results showed an efficiency of recovery of around 99.3%, for example with a head grade of 900 grams/ton and tailings of about 6 grams per ton of gold.

The disclosed method when applied to cyanide leaching produces a clearer effluent through the graded sand filter. This is an advantage for the electrowinning that occurs after leaching. It provides better liquid/solid separation. The competing technologies discard the fines before leaching commences or have an inefficient and incomplete way of separating the liquid from the solids. The present system is easily scalable, both upwardly and downwardly, so is cost-effective at both small scale and at large scale unlike competing systems. It is readily acceptable to industry being based on conventional mixing technology that is widely used and understood in the extraction of gold and uses widely available components.

Dewatering of Particulate Solids

It has been found that generally the same apparatus and methodology used for cyanide leaching as described above can be used more generally for dewatering of particulate solids of many kinds where such solids would not otherwise be free draining. While the method can be used with a slurry of just fine particulate materials, it has been found particularly effective where a seed amount of coarser, heavier particulate material is also added to form the filter bed.

The following tests as set out in examples 2 and 3 were performed on a laboratory-size, scaled-down version of the apparatus used in Example 1 and shown in FIG. 5. The liquid/solid separation method was also essentially the same. Where a coarse filter bed material was added to the slurry, silica sand particles of mixed coarseness were used as the bed material. Such coarse particles were screened to range from 2 mm to 4 mm in diameter and may be different sized fractions depending on the feed material characteristics.

As in the leaching method described above, the solids to be dewatered, with or without the seed filter bed material according to the particular test, were added to the tank 20 along with the desired amount of water, with the surface level of the liquid lying above the agitator. Agitator 40 was started rotating for several minutes at low speed (40-60 hz or 800 to 1200 rpms) until the solid particles were in suspension. Shortly before the agitator was stopped, flocculant was added to the mixture. The type of flocculant such as polymer flocculant, is determined by the type of particulate solids to be agglomerated. The agitator 40 was then slowed and stopped over four minutes and the solids allowed to settle. The heavier particles settle most quickly to form a filter bed 50, followed by the lighter particles. Hence if coarser heavier particles were added as a seed bed those settled to form the filter bed first. As with the leaching method described above, when the finest particles settle out of the slurry, a thin film forms at 54 over the bed 50. To allow liquid to continue to flow through bed 50, well points or screens 60 extend through the fines film that coats the filter bed at 54.

The well points are then cleared by back flushing, by reversing vacuum pump 56, and then recirculating liquid down through the well points by vacuum pump 56 with the well point valves open and central draw through screened pots 48 closed. Once the well points are clear, after about 3 minutes of recirculation, the well point valves are closed and the liquid is drawn through the well points into bed 50 and out bottom screened pots 48 by vacuum pump 56. Initially the filtered liquid is then recirculated by sending it back above the filter bed into the top of tank 20 and then through the well points 60 and filter bed 50 for a further short period of time, such as 5-6 minutes, to clarify the liquid, until the clarity of the effluent is clear enough for further processing. The liquid can then be sucked directly by vacuum pump 56 through the well points 60 by opening the valved connection of the well points to pipe 52, or indirectly through bed 50 and pots 48 into outlet pipe 52, and pumped to a holding tank. In the case of the dewatering process, the dewatered solids are then physically removed by mechanical means out of the tank for transport elsewhere. For example, where large scale tanks are used, access may be provided to the interior of the tank by a manned compact track loader or skid-steer loader to physically dig out and transport the dewatered solids. Access to the tank may be, for example, by a removable sealed door.

Example 2—Fine Mineral Feed

Effective dewatering of a fine mineral feed by using a prepared coarse mineral bed material in the agitated tank was achieved. Two tests were run, one in which no coarse bed material was added and one in which 4 kg of coarse bed material was added to the tank. The fine mineral feed used was a residue of cyanide-leached shaking table tailings. It was a fine particle gradation, finely graded whereby all particles were less than 1 mm in diameter and there was a P80 of 370 microns (80% of material passed a screen of 370 microns). The following parameters were observed and measured, where "charge weight" is the total weight of solids (including the seed filter bed material), "wt bed material (%)" is the percent by weight of the bed material to the total charge weight, "floc addition (g) is the number of grams of flocculant added, "pulp density (%) is the weight percent of solid to the total weight of the slurry, "settling time" is the time in minutes after cessation of agitation and prior to draining, and "drain time" is the time in minutes from commencement of draining to when there is no standing water above the bed and no further liquid flowing through the well points.

|  | Fine Mineral Feed | |
| --- | --- | --- |
| Test Number | 1 | 2 |
| Charge weight (kg) | 6 | 10 |
| Wt Bed Material (%) | 0 | 40 |
| Floc Addition (g) | 25 | 25 |
| Pulp Density (%) | 40 | 40 |
| Settling Time (min) | 15 | 15 |
| Drain Time (min) | >300 | 45 |

From this test it is shown that, without coarse bed material, 6 kg of the fine mineral feed took >300 minutes to naturally dewater though the drain in the bottom of the tank. When 4 kg of coarse bed material was added to the tank the total time for dewatering (such that no standing water was present above the material) was reduced to 45 minutes.

Example 3—Dewatering of Organic Matter (Soil)

Effective dewatering of organic matter by using a prepared coarse mineral bed material in the agitated tank was also achieved. Two tests were run, one in which no coarse bed material was added and one in which 5 kg of coarse bed material was added to the tank. The organic matter was standard gardening top soil. A single cycle of agitation, settling and vacuum was used. The following parameters were measured and observed.

|  | Organic Matter (Soil) | |
| --- | --- | --- |
| Test Number | 1 | 2 |
| Charge weight (kg) | 2.5 | 5 |
| Wt Bed Material (%) | 0 | 50 |
| Floc Addition (g) | 30 | 30 |
| Pulp Density (%) | 25 | 25 |

-continued

|  | Organic Matter (Soil) | |
| --- | --- | --- |
| Test Number | 1 | 2 |
| Settling Time (min) | 45 | 45 |
| Drain Time (min) | 300 | 15 |

From this test it is shown that that, without coarse bed material, 2.5 kg of the soil feed took 300 minutes to naturally dewater though the drain in the bottom of the tank. When 5 kg of coarse bed material was added to the tank the total time for dewatering (such that no standing water was present above the material) was cut to 15 minutes.

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within their true spirit and scope.

What is claimed is:

1. Apparatus for separating a liquid from particulate solids, comprising:
   i) a tank for containing said particulate solids and liquid as a slurry;
   ii) an input to the interior of said tank for introduction of said particulate solids and liquid into said tank;
   iii) a liquid outlet passage communicating with the interior of said tank;
   iv) an agitator suspended within said tank for forming a suspension of said particulate solids in said liquid;
   v) said tank having a filter bed zone in a lower part thereof for formation of a filter bed from the settling of said particulate solids from said suspension and through which liquid drains from the tank; and
   vi) a screen pipe extending upwardly through said filter bed zone, said screen pipe provided with a hollow interior and provided on its surface a plurality of openings to said hollow interior along its length above and below said filter zone and communicating with said outlet passage to receive at its upper end a flow of liquid from above said filter bed zone which is carried downwardly to flow out through said filter bed to said outlet passage or directly to said outlet passage.

2. Apparatus of claim 1 wherein said screen pipe is a well point or well screen.

3. Apparatus of claim 1 wherein said agitator is a variable speed agitator.

4. Apparatus of claim 1 further comprising:
   vii) passage for removal of solid particles from said tank after liquid separation.

5. Apparatus of claim 1 further comprising
   viii) a pump for removal of liquid through said liquid outlet passage.

6. The apparatus of claim 1 used for agitation leaching of mineral-bearing or metal-bearing particles, a significant portion of which is 1 mm in diameter or greater, wherein said particulate material comprises gold, silver, copper or uranium and said liquid comprises concentrations of lixiviant.

* * * * *